United States Patent
Tevanian, Jr.

(10) Patent No.: US 7,430,679 B2
(45) Date of Patent: Sep. 30, 2008

(54) CHARGING OF MOBILE DEVICES

(75) Inventor: Avadis Tevanian, Jr., Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 443 days.

(21) Appl. No.: 11/216,321

(22) Filed: Aug. 31, 2005

(65) Prior Publication Data

US 2007/0067659 A1 Mar. 22, 2007

(51) Int. Cl.
*G06F 1/00* (2006.01)
*G06F 1/26* (2006.01)
(52) U.S. Cl. .................. 713/324; 713/300; 713/320
(58) Field of Classification Search .................. 713/324
See application file for complete search history.

(56) References Cited

U.S. PATENT DOCUMENTS

| | | | |
|---|---|---|---|
| 6,009,529 A | 12/1999 | Park | |
| 6,345,364 B1 | 2/2002 | Lee | |
| 6,516,418 B1 | 2/2003 | Lee | |
| 2005/0174094 A1 | 8/2005 | Purdy et al. | |
| 2006/0035527 A1 | 2/2006 | Numano | |
| 2006/0277555 A1* | 12/2006 | Howard et al. | 720/600 |

FOREIGN PATENT DOCUMENTS

| | | |
|---|---|---|
| EP | 1 333 360 A2 | 1/2003 |
| EP | 1 271 289 A1 | 2/2003 |

OTHER PUBLICATIONS

PCT International Search Report received in corresponding Application No. PCT/US2006/029441 dated Dec. 13, 2006.
Anonymous: "Targus Universal USB Docking Station with Build-in Audio and Video" Internet Article, [online] Jun. 6, 2006 Retrieved from the Internet URL: http://www.targus.com/ca/about_pr_06152005.asp [retrieved on Nov. 29, 2006].

* cited by examiner

*Primary Examiner*—Rehana Perveen
*Assistant Examiner*—Stefan Stoynov
(74) *Attorney, Agent, or Firm*—Wong, Cabello, Lutsch, Rutherford & Brucculeri, LLP

(57) ABSTRACT

A system which enables battery powered devices such as notebook computers to efficiently charge smaller mobile devices such as music players, cell phones and PDAs using the power signals provided over their data connections is made more efficient by ensuring that the power to the small mobile device is not interrupted should the notebook computer otherwise go into a standby or low-power state. The presence of the small mobile device is known and any power-down capabilities of the notebook computer are limited, at least for the period where the small mobile device is being recharged. This detection can be done at any of the levels of software present in the notebook computer. This charging and not powering down can be further optimized by determining the particular device and its charging requirements or by having the device provide feedback as to its charge state.

25 Claims, 2 Drawing Sheets

CHARGING OF MOBILE DEVICES

BACKGROUND OF THE INVENTION

1. Field of the Invention

The invention relates to electronic devices used to charge and communicate with mobile electronic devices.

2. Description of the Related Art

In modern society we are becoming ever more mobile. It is very common to have notebook computers in small and light form factors to greatly aid in communications and computing in varying locations. One common aspect of notebook computers is that they are battery powered. As a result, they all have some sort of algorithm to conserve the battery power. Typically this includes entering low-power or standby states after determined periods of inactivity. During these standby or low-power states one of the common things that is done is to turn off power to all of the peripheral devices and peripheral ports.

Also common in the modern mobile society are small electronic mobile devices such as cell phones, music players and PDAs (Personal Data Assistants). All of these are very small, battery powered personal devices. In many cases they connect to a larger computer, such as a notebook computer or a desktop computer, to receive files and to otherwise interface with the larger computer system. Because they are smaller devices and battery powered, they have a limited lifetime on their battery charge. To this end they need to be charged on a reasonably frequent basis.

One of the common ways that has been developed for these types of devices to be recharged is to plug them into the computer using their data connection and then use the power provided on that data connection to recharge the devices. For example, say the device connects by a USB or 1394 interface. A constant DC voltage is provided on each of those interfaces and this DC voltage can be readily used to recharge the batteries in the mobile device. In this manner the user does not have to carry around AC adapters for each of the particular devices and does not have to rely on disposable batteries. They can just use their standard data connection cable for recharging capabilities. This recharging of these small mobile devices is not an appreciable draw or drain on the notebook computer battery, for example, as that is a very high capacity battery as compared to the particular small devices.

Given that this capability of charging the small mobile devices from the larger mobile device such as the notebook computer is common and becoming ubiquitous, it is desirable to be able to make this process as efficient as possible to simplify user operations.

BRIEF SUMMARY OF THE INVENTION

A system according to the present invention enables battery powered devices such as notebook computers to efficiently charge smaller mobile devices such as music players, cell phones and PDAs using the power signals provided over their data connections. This is done efficiently by ensuring that the power to the small mobile device is not interrupted, particularly not interrupted should the notebook computer otherwise go into a standby or low-power state. This addresses a problem which has been determined in existing devices where, when the notebook computer goes to sleep or powers down, all the peripheral device ports are turned off and power is disconnected from them. Thus this power disconnection removes the power connection being used simply to charge the small mobile devices.

In systems according to the present invention, the presence of the small mobile device is known and any power-down capabilities of the notebook computer are limited, at least for the period where the small mobile device is being recharged. This detection can be done at any of the levels of software present in the notebook computer. For example, an application can detect the presence of the device and then tell the operating system not to go into a low power state. The detection can be done by the operating system itself and thus detect that it should not itself go into the low-power state. It can be done at a lower firmware level so that even should the operating system try to put the computer into a power-down state, the firmware or BIOS will override such capabilities.

This charging and not powering down can be further optimized by determining the particular device and its charging characteristic or charging requirements or by having the device provide feedback as to its charge state. As soon as it is determined that the device is fully charged, then the notebook computer can be returned to full power-down conditions as in normal operations.

Thus by not allowing the computer to power-down at least the power provided through the peripheral data ports, the small mobile devices can be rapidly charged.

A BRIEF DESCRIPTION OF THE FIGURES

DETAILED DESCRIPTION OF THE PREFERRED EMBODIMENT

Figure 1:
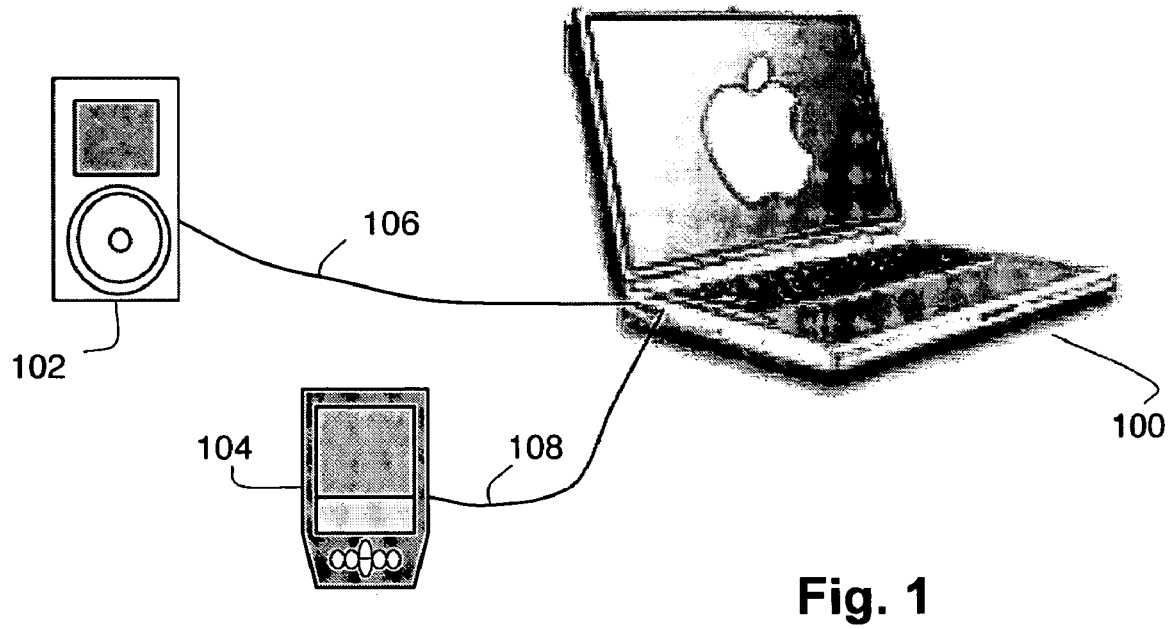
FIG. 1 is a drawing illustrating various small mobile devices connected to a notebook computer.

Referring now to FIG. 1, an exemplary notebook computer 100 is connected to a music player 102 and a PDA 104. The music player 102 is connected to the notebook computer 100 using a link 106 such as USB or 1394. Similarly, the PDA 104 is connected to the notebook computer 100 using a data link 108, again a USB link in common practice or a 1394 or other link as desired. The data links 106 and 108 are the conventional data links used between the devices 102 and 104 and the notebook computer 100 to transfer data. For example, the data link 106 is normally used to transfer music files between the notebook computer 100 and the music player 102. The data link 108 is used to provide the communications between the notebook computer 100 and the PDA 104. By using the power lines present on the data links, it is thus possible to charge the various mobile devices, such as the music player 102 or the PDA 104.

Figure 2:
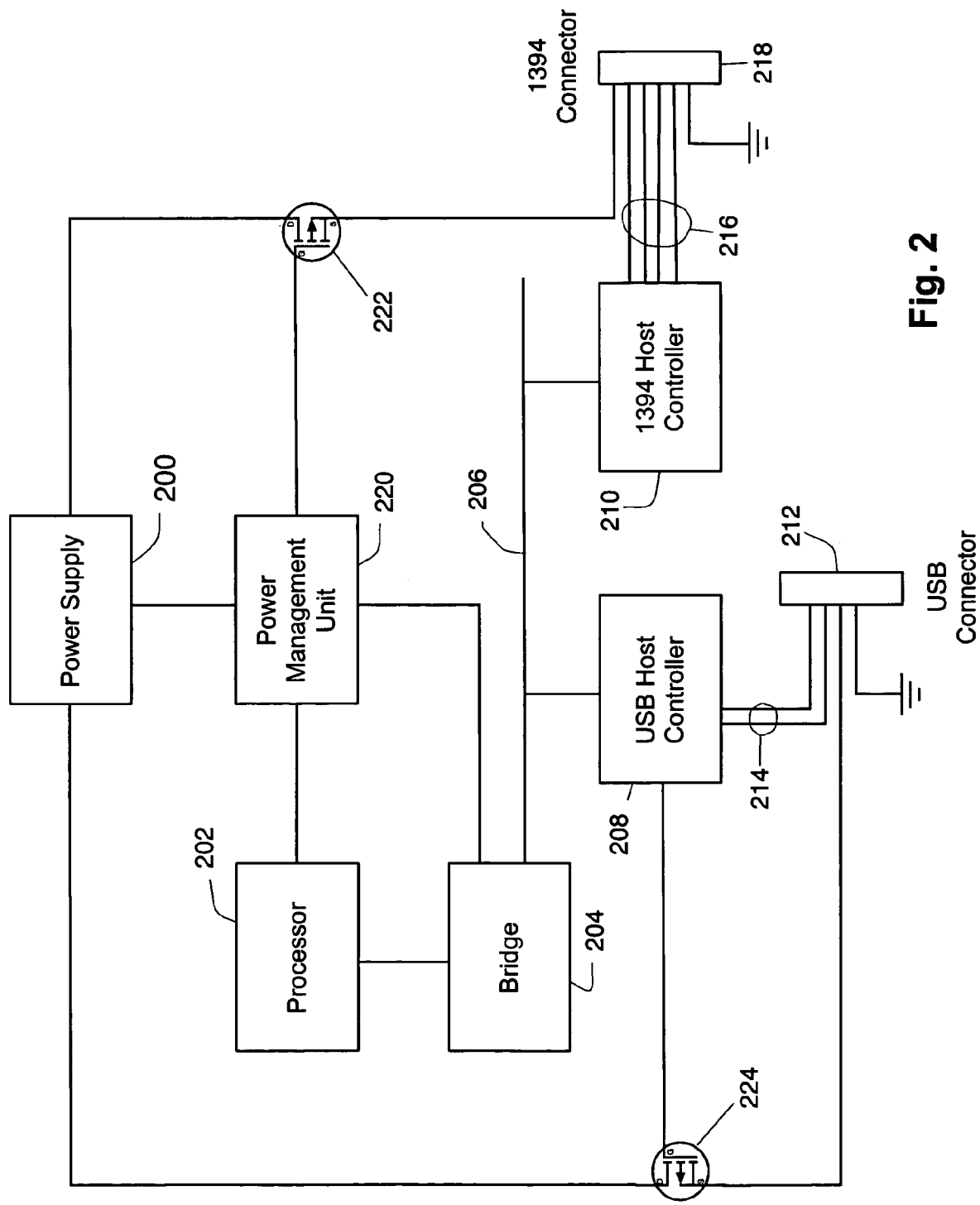
FIG. 2 is a block diagram of an exemplary notebook computer including the details relating to the power connections for the peripheral device ports.

Referring now to FIG. 2, a simplified block diagram of the exemplary notebook computer 100 is shown. A power supply 200 is used to power the notebook computer 100 and any devices connected to the notebook computer 100 as desired. Most of the power supply connections are not shown for simplicity. A processor or CPU 202 forms the core processing element of the notebook computer 100. The processor 202 is connected to a bridge chip 204 which connects the processor 202 to memory (not shown) and to various peripheral buses as desired. One of the peripheral buses provided by the bridge 204 can be a bus such as a PCI bus 206. In the illustrated example a USB host controller 208 is connected to the PCI bus 206, as is a 1394 host controller 210. The USB host controller 208 is connected to a USB connector 212. It can be seen that the two data lines 214 in the USB connection are provided directly from the USB host controller 208 to the USB connector 212. One of the other connections on the USB connector 212 is connected to ground. Similarly the 1394 host controller 210 provides four data lines 216 to a 1394 connector 218. A fifth line on the illustrated 1394 connector 218 is connected to ground. The final line on each of the USB connector 212 and the 1394 connector 218 is a power line.

To assist and manage the power-down of the notebook computer 100 a power management unit 220 is connected to the processor 202, to the bridge 204 and to the power supply 200. The power management unit 220 has various requirements and capabilities to detect system operation and to also timely control the power down of the various systems in the notebook computer 100. This includes control of clock systems (not shown) and various transistors used to control switchable power lines. For example, power management unit 220 is connected to the gate of a transistor 222. The drain of the transistor 222 is connected to the power supply 200 while the source of the transistor 222 is connected to the power pin of the 1394 connector 218.

In a similar manner the USB host controller 208 is connected to the gate of a transistor 224, whose drain is connected to the power supply 200 and whose source is connected to the power pin of the USB connector 212. Thus the power management unit 220 is responsible for controlling the transistor 222 to provide power to the 1394 connector 218, while the USB host controller 208 includes internal registers to control the transistor 224 which provides power to the USB connector 212. There is also a link between the power management unit 220 and the bridge 204 to allow the processor 202 to interoperate and communicate with the power management unit 220.

Therefore if power-down of the notebook computer 100 is desired, the power management unit 220 disables or turns off the transistor 222 while the USB host controller 208 is instructed by the processor 202 to turn off or disable the transistor 224. The power management unit 220 in many cases also controls power to the USB host controller 208 and the 1394 host controller 210 such that they are powered-off, as well as having their clock signals stopped.

Figure 3:
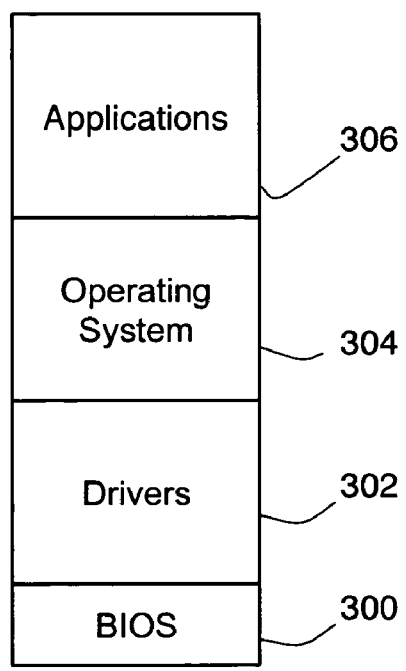
FIG. 3 is a block diagram illustrating the various software layers present in an exemplary notebook computer.

Referring now to FIG. 3 a simple diagram of the software present in the exemplary notebook computer 100 is shown. The lowest level of software is the BIOS or basis input/output system 300. This is the lowest level of software and is often contained in an EPROM and is otherwise known as firmware. The BIOS 300 provides the lowest level of interconnect between the physical devices, i.e., the peripheral devices, and the higher level software in the notebook computer 100. Interacting with the BIOS 300 are the drivers 302. These drivers act as an interface between the low-level functionality of the BIOS 300 and the high-level operations of the operating system 304. Present above the operating system 304 are the individual applications 306.

As noted above, it has been determined that one of the problems with a system as shown in FIG. 1 is that should the notebook computer 100 go into a power-down or sleep mode, power on the exemplary 1394 and USB connectors 212 and 218 is disabled. Thus any charging of the connected music player 102 or PDA 104 is halted while the laptop or notebook computer 100 is in the low power state.

In systems according to the present invention, one of the software modules, such as the BIOS 300, the operating system 304, the drivers 302 or the applications 306, determines the existence and connection of an external device such as the music player 102 or the PDA 104. In one embodiment the appropriate recognizing software can then instruct the operating system 304 not to disable the power to the connected mobile device. This can be done in several manners. For example, if it is an application program, such as iTunes from Apple Computer, Inc., the application can detect an attached iPod from Apple Computer, Inc., and inform the operating system at a high level not to perform any power management functions. This state can remain in effect even if the application is terminated.

While this approach is quite satisfactory at performing the desired function of recharging the mobile device, there are further optimized embodiments. For example, the operating system 304 can also detect the presence of the connected mobile device. The operating system 304 can then on its own not enter the power-down state. Alternatively, the operating system 304 can enter a power-down state for all components except for the particular port to which the mobile device is connected. In a further embodiment, the data connections to that particular connected port can be powered down, just so long as the power connection, i.e., the DC connection from the appropriate transistor 222 or 224, is still being provided to charge the device. This could also additionally be done at the driver level or BIOS level if desired.

In the most simplistic embodiments, the port or the computer is not powered down until it is detected that the device has been removed. This may be inefficient in certain cases, such as the mobile device being fully charged and yet the notebook computer 100 will still not be allowed to go into a lower-power state, but it is still an improved manner of charging the mobile device. This embodiment can be optimized by determining the particular type of peripheral or mobile device attached to the notebook computer 100 and determining its power charging characteristics. For example, in certain instances the mobile device is relative simplistic and its recharging time is known. Therefore the controlling function, such as the application software, can inform the operating system not to go into the low-power state for a time greater than the known recharging time of the mobile device.

In a more sophisticated example, the mobile device can report its charging status and therefore the relevant software can periodically query the mobile device and determine its charge state. When the device is fully charged, then the application or other software can instruct the operating system that full power-down can occur.

Another enhancement is a determination whether the charging device such as the notebook computer 100 is operating on AC power or is itself operating on DC power. Should the operation be on AC power, then a relatively simplistic operation can be used such as not entering any power-down state. If, however, it is operating in a DC power condition off its own internal battery, then more sophisticated algorithms, such as feedback of actual charge status or defined time as discussed above, can be utilized if desired. Further, the notebook computer 100 can actually go into a lower-power state periodically while still having power to the attached mobile device being provided. The notebook computer 100 can then wake-up periodically to query the attached mobile device to determine if it has been fully charged. If it has not been fully charged, the cycle can repeat as the notebook computer 100 goes into another power-down state until the next time to wake-up and check charging status. When the mobile device finally indicates a fully charged state, even the power to the mobile device can be disabled and the notebook computer 100 can stop the periodic wake up.

While a notebook computer 100 has been used as an example host device to provide the charging capabilities, it is understood that desktop computers and numerous other types of electronic devices which also enter power-down states and which can be used to recharge smaller mobile devices can perform in a similar manner. For example, if a television set were to have the appropriate 1394 port, it could be used to charge a 1394 connected device, such as a music player. The television set could determine that it is being used as a charging source for the music device and not turn off that port. While 1394 and USB connections have been used as examples, it is understood that any connection providing power, such as PS/2 keyboard and mouse connections, may be utilized. Further, it is understood that the operations can be performed in parallel for multiple connected devices.

The preceding description was presented to enable any person skilled in the art to make and use the invention as claimed and is provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

What is claimed is:

1. A method for operating a device having a port for receiving a rechargeable external device, the port including a power connection, the device powering down portions of the device, one of the portions including the port, the method comprising:
   determining the connection of a rechargeable external device to the port; and
   limiting the powering down of the device so that the rechargeable external device continues to receive power from the port,
   wherein limiting the powering down inhibits the device from normally powering down,
   wherein the inhibiting is performed only for a predetermined period, and
   wherein the predetermined period is dependent on the rechargeable external device.

2. The method of claim 1, wherein limiting the powering down inhibits only the port from being normally powered down.

3. The method of claim 1, wherein the device includes a processor, an operating system and an application program, wherein the operating system manages normal powering down, wherein the application program determines the connection of the rechargeable external device, and wherein the application program instructs the operating system to limit powering down.

4. The method of claim 1, wherein the device includes a processor and an operating system, wherein the operating system manages normal powering down and wherein the operating system determines the connection of the rechargeable external device and the operating system instructs itself to limit powering down.

5. The method of claim 1, wherein the device includes a battery and is configured to be powered from an AC source or the battery, and wherein limiting the powering down is performed differently if the device is powered from the AC source or the battery.

6. A method for operating a device having a port for receiving a rechargeable external device, the port including a power connection, the device powering down portions of the device, one of the portions including the port, the method comprising:
   determining the connection of a rechargeable external device to the port; and
   limiting the powering down of the device so that the rechargeable external device continues to receive power from the port,
   wherein the port further includes data lines and wherein limiting the powering down allows the data lines of the port to be powered down but inhibits the power connection of the port from being normally powered down.

7. The method of claim 6, wherein the device includes a battery and is configured to be powered from an AC source or the battery, and wherein limiting the powering down is performed differently if the device is powered from the AC source or the battery.

8. A method for operating a device having a port for receiving a rechargeable external device, the port including a power connection, the device powering down portions of the device, one of the portions including the port, the method comprising:
   determining the connection of a rechargeable external device to the port; and
   limiting the powering down of the device so that the rechargeable external device continues to receive power from the port,
   wherein limiting the powering down includes:
     allowing selected portions of the device other than the port to be powered down;
     periodically powering up selected portions of the device to determine if the rechargeable external device is recharged;
     if the rechargeable external device is not recharged, powering down the portions of the device that were powered up; and
     if the rechargeable external device is recharged, no longer limiting powering down of the device.

9. The method of claim 8, wherein the device includes a battery and is configured to be powered from an AC source or the battery, and wherein limiting the powering down is performed differently if the device is powered from the AC source or the battery.

10. A device comprising:
    a processor;
    memory coupled to said processor;
    a power supply;
    a port coupled to said processor and said power supply to provide power and data connections from said port, said port for connecting an external rechargeable device;
    a power management element coupled to said processor, said power supply and said port for controlling normal powering down of the device; and
    a computer program stored in said memory and executing on said processor, said computer program:
      determining the connection of a rechargeable external device to the port; and
      limiting the powering down of the device so that the rechargeable external device continues to receive power from the port,
    wherein limiting the powering down inhibits the device from normally powering down,
    wherein the inhibiting is performed only for a predetermined period, and
    wherein the predetermined period is dependent on the rechargeable external device.

11. The device of claim 10, wherein limiting the powering down inhibits only the port from being normally powered down.

12. The device of claim 10, wherein said computer program includes an operating system and an application program, wherein the operating system manages normal powering down, wherein the application program determines the connection of the rechargeable external device, and wherein the application program instructs the operating system to limit powering down.

13. The device of claim 10, wherein said computer program includes an operating system, wherein the operating system manages normal powering down and wherein the operating system determines the connection of the rechargeable external device and the operating system instructs itself to limit powering down.

14. The device of claim 10, wherein said power supply includes a battery and the device is configured to be powered from an AC source or the battery, and wherein limiting the powering down is performed differently if the device is powered from the AC source or the battery.

15. A device comprising:
a processor;
memory coupled to said processor;
a power supply;
a port coupled to said processor and said power supply to provide power and data connections from said port, said port for connecting an external rechargeable device;
a power management element coupled to said processor, said power supply and said port for controlling normal powering down of the device; and
a computer program stored in said memory and executing on said processor, said computer program:
determining the connection of a rechargeable external device to the port; and
limiting the powering down of the device so that the rechargeable external device continues to receive power from the port,
wherein the port further includes data lines and wherein limiting the powering down allows the data lines of the port to be powered down but inhibits the power connection of the port from being normally powered down.

16. The device of claim 15, wherein said power supply includes a battery and the device is configured to be powered from an AC source or the battery, and wherein limiting the powering down is performed differently if the device is powered from the AC source or the battery.

17. A device comprising:
a processor;
memory coupled to said processor;
a power supply;
a port coupled to said processor and said power supply to provide power and data connections from said port, said port for connecting an external rechargeable device;
a power management element coupled to said processor, said power supply and said port for controlling normal powering down of the device; and
a computer program stored in said memory and executing on said processor, said computer program:
determining the connection of a rechargeable external device to the port; and
limiting the powering down of the device so that the rechargeable external device continues to receive power from the port,
wherein limiting the powering down includes:
allowing selected portions of the device other than the port to be powered down;
periodically powering up selected portions of the device to determine if the rechargeable external device is recharged;
if the rechargeable external device is not recharged, powering down the portions of the device that were powered up; and
if the rechargeable external device is recharged, no longer limiting powering down of the device.

18. The device of claim 17, wherein said power supply includes a battery and the device is configured to be powered from an AC source or the battery, and wherein limiting the powering down is performed differently if the device is powered from the AC source or the battery.

19. A computer readable medium or media having computer-executable instructions stored therein for performing the following method for operating a device having a port for receiving a rechargeable external device, the port including a power connection, the device powering down portions of the device, one of the portions including the port, the method comprising:
determining the connection of a rechargeable external device to the port; and
limiting the powering down of the device so that the rechargeable external device continues to receive power from the port,
wherein limiting the powering down inhibits the device from normally powering down,
wherein the inhibiting is performed only for a predetermined period, and
wherein the predetermined period is dependent on the rechargeable external device.

20. The computer readable medium or media of claim 19, wherein limiting the powering down inhibits only the port from being normally powered down.

21. The computer readable medium or media of claim 19, wherein the device includes a battery and is configured to be powered from an AC source or the battery, and wherein limiting the powering down is performed differently if the device is powered from the AC source or the battery.

22. A computer readable medium or media having computer-executable instructions stored therein for performing the following method for operating a device having a port for receiving a rechargeable external device, the port including a power connection, the device powering down portions of the device, one of the portions including the port, the method comprising:
determining the connection of a rechargeable external device to the port; and
limiting the powering down of the device so that the rechargeable external device continues to receive power from the port,
wherein the port further includes data lines and wherein limiting the powering down allows the data lines of the port to be powered down but inhibits the power connection of the port from being normally powered down.

23. The computer readable medium or media of claim 22, wherein the device includes a battery and is configured to be powered from an AC source or the battery, and wherein limiting the powering down is performed differently if the device is powered from the AC source or the battery.

24. A computer readable medium or media having computer-executable instructions stored therein for performing the following method for operating a device having a port for receiving a rechargeable external device, the port including a power connection, the device powering down portions of the device, one of the portions including the port, the method comprising:
determining the connection of a rechargeable external device to the port; and
limiting the powering down of the device so that the rechargeable external device continues to receive power from the port,
wherein limiting the powering down includes:
allowing selected portions of the device other than the port to be powered down;

periodically powering up selected portions of the device to determine if the rechargeable external device is recharged;
if the rechargeable external device is not recharged, powering down the portions of the device that were powered up; and
if the rechargeable external device is recharged, no longer limiting powering down of the device.

25. The computer readable medium or media of claim 24, wherein the device includes a battery and is configured to be powered from an AC source or the battery, and wherein limiting the powering down is performed differently if the device is powered from the AC source or the battery.

* * * * *